(12) United States Patent
Islam et al.

(10) Patent No.: US 6,603,910 B2
(45) Date of Patent: Aug. 5, 2003

(54) METHOD AND SYSTEM FOR GENERATING A BROADBAND SPECTRAL CONTINUUM AND CONTINUOUS WAVE-GENERATING SYSTEM UTILIZING SAME

(75) Inventors: Mohammed N. Islam, Ann Arbor, MI (US); Ozdal Boyraz, Ann Arbor, MI (US); Jaeyoun Kim, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 42 days.

(21) Appl. No.: 10/135,596

(22) Filed: Apr. 30, 2002

(65) Prior Publication Data

US 2002/0131693 A1 Sep. 19, 2002

Related U.S. Application Data

(63) Continuation of application No. 09/454,106, filed on Dec. 3, 1999, now Pat. No. 6,381,391, which is a continuation-in-part of application No. 09/253,852, filed on Feb. 19, 1999, now Pat. No. 6,480,656.

(51) Int. Cl.$^7$ ................................................. G02B 6/02
(52) U.S. Cl. ..................................................... 385/123
(58) Field of Search ............................... 385/30–33, 24, 385/16, 123–130, 140, 147; 359/110, 160, 161, 359, 154; 372/24–26, 96

(56) References Cited

U.S. PATENT DOCUMENTS

| | | | |
|---|---|---|---|
| 4,558,921 A | 12/1985 | Hasegawa et al. | |
| 4,727,553 A | 2/1988 | Fork et al. | |
| 4,925,259 A * | 5/1990 | Emmett | 359/359 |
| 4,995,690 A | 2/1991 | Islam | |
| 5,142,224 A * | 8/1992 | Smith et al. | 324/765 |
| 5,631,758 A | 5/1997 | Knox et al. | |
| 5,655,039 A | 8/1997 | Evans | |
| 5,689,596 A | 11/1997 | Evans | |
| 5,717,797 A | 2/1998 | Evans | |
| 5,737,460 A | 4/1998 | Damen et al. | |
| 6,243,181 B1 | 6/2001 | Golovchenko et al. | |
| 6,381,391 B1 * | 4/2002 | Islam et al. | 385/123 |
| 6,480,656 B1 * | 11/2002 | Islam et al. | 385/123 |
| 2002/0131693 A1 * | 9/2002 | Islam et al. | 385/24 |
| 2003/0012495 A1 * | 1/2003 | Islam et al. | 385/31 |

OTHER PUBLICATIONS

P. Beaud, et al., "Ultrashort Pulse Propagation, Pulse Breakup, and Fundamental Soliton Formation in a Single–Mode Optical Fiber", IEEE, 1987.

(List continued on next page.)

*Primary Examiner*—Akm E. Ullah
(74) *Attorney, Agent, or Firm*—Brooks & Kushman P.C.

(57) ABSTRACT

Method and system are disclosed for stable, multi-wavelength continuous wave (CW) generation using fiber-based supercontinuum and spectrum-slicing of its longitudinal modes. The continuum generated is coherent and stable, making it an attractive alternative as a spectrally-sliced source for continuous, multiple wavelength channels. A 140 nm wide supercontinuum with a 10 GHz repetition rate is generated in <30 meters of fiber. To obtain CW channels with 40 GHz spacing, time-domain multiplexing and longitudinal mode slicing are utilized. To obtain stable, continuous wave operation, short-fiber supercontinuum generation and a pulse interleaving method are utilized. The invention may be utilized as a broadband wavelength-division multiplexed source.

8 Claims, 3 Drawing Sheets

OTHER PUBLICATIONS

K.J. Blow, et al., "Suppression of the Soliton Self–Frequency Shift by Bandwidth–Limited Amplification", Optical Science of America, Jun. 1988, vol. 5., No. 6.

M. N. Islam, et al., "Femtosecond Distributed Soliton Spectrum in Fibers", Optical Society of America, 1989, vol. 6., No. 6.

K. Mori, et al., "Flatly Broadened Supercontinuum Spectrum Generated in a Dispersion Decreasing Fibre With Convex Dispersion Profile", Electronics Letters, Oct. 9, 1997, vol. 33, No. 21.

J.W. Lou, et al., "Broader and Flatter Supercontinuum Spectra In Dispersion–Tailored Fibers", Technical Digest, 1997.

Masataka Nakazawa, et al., "Coherence Degradation in the Process of Supercontinuum Generation in an Optical Fiber", Optical Fiber Technology, 1998, Article No. OF980253.

A.S. Gouveia–Neto, et al., "Femtosecond Soliton Raman Generation", IEEE Journal of Quantum Electronics, Feb. 2, 1988, vol. 24, No. 2.

K.L. Vodop'Yanov, et al., "Generation of Pulses of 100–200 F Sec Duration by Stimulated Raman Scattering in a Single–Mode Fiber Waveguide at Wavelengths 1.5–1.7", So. J. Quantum Electron, Oct. 1987.

T. Morioka, et al., "Nearly Penalty–Free, <4ps Supercontinuum Gibt/s Pulse Generation Over 1535–1560nm", Electronic Letters, May 12, 1994.

Toshiaki Okuno, et al., "Generation of Ultra–Broad–Band Supercontinuum by Dispersion–Flattened and Decreasing Fiber", IEEE Photonics Technology Letter, Jan. 19, 1998, vol. 10., No. 1.

H. Sotobayashi, et al., 325nm Bandwidth Supercontinuum Generation at 10 Gbit/s Using Dispersion–Flattened and Non–Decreasing Normal Dispersion Fibre With Pulse Compression Technique, Electronics Letters, Jun. 25, 1998, vol. 34, No. 13.

Yuichi Takushima, et al., "Generation of Over 140–nm–Wide Super–Continuum From a Normal Dispersion Fiber By Using a Mode–Locked Semiconductor Laser Source", IEEE Photonics Technology Letters, Nov. 11, 1998, vol. 10, No. 11.

T. Morioka, et al., "1 Tbit/s (100 Gbit/s×10 Channel) OTDM/WDM Transmission Using A Single Supercontinuum WDM Source", Electronics Letter, May 9, 1996, vol. 32, No. 10.

Sanjok, H., et al., Multiwavelength Light Source with Precise Frequency Spacing Using a Mode–Locked Semiconductor Laser and an Arrayed Waveguide Grating Filter, IEEE Photonics Technology Letters, vol. 9, No. 6, Jun. 1997.

Veselka, J.J., et al., A Multiwavelength Source Having Precise Spacing for WDM Systems, IEEE Photonics Technology Letters, vol. 10, No. 7 Jul. 1998.

* cited by examiner

METHOD AND SYSTEM FOR GENERATING A BROADBAND SPECTRAL CONTINUUM AND CONTINUOUS WAVE-GENERATING SYSTEM UTILIZING SAME

CROSS-REFERENCE TO RELATED APPLICATION

This is a continuation of 09/454,106 filed Dec. 3, 1999, now U.S. Pat. No. 6,381,391 which is a division of 09/253,852 filed on Feb. 19, 1999, now U.S. Pat. No. 6,480,656 and entitled "Method and System for Generating a Broadband Spectral Continuum, Method of Making the System and Pulse-Generating System Utilizing Same".

GOVERNMENT RIGHTS

This invention was made with government support under AFOSR Grant F30602-97-1-0202. The government has certain rights in the invention.

TECHNICAL FIELD

This invention relates to methods and systems for generating a broadband spectral continuum and continuous wave-generating systems utilizing same.

BACKGROUND ART

Trends in DWDM sources include: increasing channel counts; narrowing channel spacing; and the use of an array of single-frequency laser diodes. However, the use of such arrays of laser diodes requires high cost for separate wavelength stabilization; inventory problems in case of channel failure; and large space required for installation of such arrays.

A spectrum-slicing scheme has been researched as a broadband wavelength division multiplexing (WDM) source. The broad spectrum for slicing is obtained by various approaches including amplified spontaneous emission (ASE), a light-emitting diode, spectral broadening due to self-phase modulation, a short-pulse mode-locked laser (MLL), and SC generation. Recently, the use of the longitudinal modes of an MLL pulse train as CW channels has been discussed in spectrum-slicing multiple wavelength sources. The technical advantage of the scheme is its precise spectral mode separation solely determined by the MLL pulse repetition rate. To generate the longitudinal modes, an MLL or an amplitude-modulated distributed feedback laser is used.

However, there are various problems related to the spectrum-slicing concept. The schemes utilizing the nonlinear spectral broadening of an optically amplified pulse suffers from amplitude jitter due to four-wave mixing of ASE. In longitudinal mode slicing schemes, the narrow spectral extent (~15 nm) and non-uniform power distribution among modes hinder their application as broadband WDM sources. In addition, very high modulation- or repetition-rates are required to satisfy current channel spacing standards.

U.S. Pat. No. 5,631,758 discloses a chirped-pulse multiple wavelength telecommunications scheme. Channel spacing is set by a modulator.

The Article by J. J. Veselka et al., entitled "A Multi Wavelength Source Having Precise Channel Spacing for WDM Systems", IEEE Photon., Technology Lett., Vol. 10, pp. 958–960, 1998 discloses an amplitude-modulated CW laser wherein channel spacing is set by the repetition rate of the amplitude modulation.

The article by H. Sanjoh et al., entitled "Multiwavelength Light Source With Precise Frequency Spacing Using A Mode-Locked Semiconductor Laser And An Arrayed Waveguide Grating Filter", IEEE Photon., Technology Lett., Vol. 9, pp. 818–820, 1997 discloses a mode-locked laser with channel spacing actively determined by pulse repetition rate of the laser and demultiplexer settings. Because the spectral range for CW channels is not flat, external flattening is required.

DISCLOSURE OF INVENTION

An object of the present invention is to provide a method and system for generating a broadband spectral continuum and a continuous wave-generating system utilizing same.

Another object of the present invention is to provide a method and system for generating a broadband spectral continuum and a continuous wave-generating system utilizing same wherein stabilization is simplified and the generation of multi-wavelengths is cost-effective.

In carrying out the above objects and other objects of the present invention, a method for generating a broadband spectral continuum is disclosed. The method includes the steps of generating soliton pulses at a repetition rate greater than or equal to 1 Gb/s. The method further includes compressing the higher-order soliton pulses in a temporal domain through soliton-effect compression to obtain compressed soliton pulses having a spectrum. The method finally includes breaking up the compressed soliton pulses to shape the spectrum of the compressed soliton pulses through higher order dispersion effects and self-phase modulation to obtain the broadband spectral continuum. The continuum has a plurality of substantially uniform longitudinal modes each of which is a narrow band continuous wave in the time domain. The modes are spectrally spaced based on the repetition rate.

Preferably, the step of compressing includes the step of launching the higher-order soliton pulse into a first end of an anomalous dispersion fiber including at least one pulse compression stage having a length based on the order of the soliton pulse and a spectral shaping stage. The step of breaking up is performed adjacent a second end of the anomalous dispersion fiber in the spectral shaping stage. The spectral shaping stage is typically a dispersion-shifted optical fiber section of the anomalous dispersion fiber.

The step of compressing may be performed in multiple pulse compression stages of the anomalous dispersion fiber.

The higher order dispersion effects typically include third order dispersion effects. The shape of the broadband spectral continuum is based primarily on the sign and magnitude of third order dispersion of the spectral shaping stage adjacent the second end. The shape of the broadband spectral continuum is also based on pulse width of the compressed soliton pulse immediately prior to the step of breaking up. The dispersion effects typically include second and third order dispersion effects, and wherein the magnitude of the second order dispersion and the magnitude of the third order dispersion normalized by the pulse width have substantially the same order of magnitude adjacent the second end of the anomalous dispersion fiber in the spectral shaping stage.

The spectral continuum is typically greater than 15 nm wide.

Further in carrying out the above objects and other objects of the invention, a system is provided for generating broadband spectral continuum. The system includes a soliton pulse generator including a single laser for generating soliton pulses at a repetition rate greater than or equal to 1 Gb/s. The system also includes an optical fiber including at least one pulse compression stage for compressing the soliton pulses through soliton-effect compression to obtain compressed soliton pulses having a spectrum. The optical fiber further includes a spectral shaping stage optically coupled to the at least one pulse compression stage for breaking up the compressed soliton pulses adjacent an output end of the fiber to shape the spectrum of the compressed soliton pulses through higher order dispersion effects and self-phase modulation to obtain the broadband spectral continuum. The continuum has a plurality of substantially uniform longitudinal mode each of which is a narrow band continuous wave in the time domain. The modes are spectrally spaced based on the repetition rate.

The at least one pulse compression stage of anomalous dispersion fiber may have a dispersion which is relatively constant therein.

The anomalous dispersion fiber may be a second pulse compression stage less than 100 and even less than 30 meters in length.

The dispersion effects typically include third order dispersions having a sign and a magnitude. The third order dispersions may have either a positive sign or a negative sign.

The system may include a plurality of pulse compression stages of anomalous dispersion fiber for compressing the soliton pulses through soliton-effect compression to obtain the compressed soliton pulses.

The length of the at least one pulse compression stage of anomalous dispersion fiber is typically based on a minimal width of the compressed soliton pulses.

Yet still further in carrying out the above objects and other objects of the invention, a system for generating narrow band, continuous waves (CW) substantially simultaneously on multiple CW channels at multiple wavelengths and with channel spacing of at least 1 GHz is provided. The system includes a soliton pulse generator including a single laser for generating soliton pulses at a repetition rate greater than or equal to 1 Gb/s. The system also includes an optical fiber having at least one pulse compression stage and a spectral shaping stage. The at least one pulse compression stage receives the soliton pulses at a first end of the fiber and the spectral shaping stage generates a broadband spectral continuum within the fiber and provides the broadband spectral continuum at a second end of the fiber. The continuum has a plurality of substantially uniform longitudinal modes each of which is a narrow band continuous wave in the time domain. The modes are spectrally spaced based on the repetition rate. The system also includes at least one optical filter coupled to the second end of the fiber for spectrally slicing the longitudinal modes from the broadband spectral continuum to obtain the continuous waves.

The system may include a time domain multiplexer to adjust spacing between the longitudinal modes. The multiplexer may include a pulse interleaver to increase channel spacing.

The single laser may be a single mode-locked laser such as a mode-locked erbium-doped fiber laser or a mode-locked semiconductor laser.

The single laser may be a single continuous-wave (CW) laser adapted to be externally modulated.

The at least one optical filter may include a monochromator, an arrayed wave guide grating, a Fabry-Perot, a Mach-Zehnder, or fused-tapered couplers.

The length of the spectral shaping stage may be less than 10 meters.

The spectral shaping stage may be a dispersion-shifted fiber.

The optical fiber may include a polarization preserving fiber.

The spectral continuum is typically greater than 15 nm wide.

The soliton pulse generator may include a polarization controller for aligning polarization of the soliton pulses with a polarization eigenmode of the at least one stage.

The system may include a fiber amplifier or a semiconductor optical amplifier for amplifying the soliton pulses. The fiber amplifier may be an erbium-doped fiber amplifier.

The optical fiber may include a high-nonlinearity (Hi-NL) fiber, a polarization preserving fiber, or a dispersion decreasing fiber.

The problems of narrow, non-uniform spectral extent are overcome with the fiber-based SC generation and the amplitude jitter is overcome by modifying the SC generation and a slicing scheme. As disclosed in the above-noted application, SC in optical fiber results from the interaction between self-phase modulation and third-order dispersion and forms a spectral region with ±0.5 dB flatness over >30 nm. Based on this, one can obtain substantially uniform longitudinal modes over a broad spectral range by seeding the SC with a high repetition rate pulse source. For example, a 140 nm SC at 10 GHz repetition rate can be obtained with an MLL and a dispersion shifted (DS) fiber.

To suppress the adverse effect of amplitude jitter on the transmission performance, the SC generation and slicing processes can be modified. First, the reduction of amplitude jitter due to noise-seeded four-wave mixing is considered herein. It is previously reported that during the SC generation in DS fiber, the ASE mapping through four-wave mixing leads to spectral coherence degradation increasing with propagation distance. The random nature of ASE causes fluctuations in amplitude and frequency.

To reduce the resultant deterioration in signal-to-noise ratio, the length of DS fiber is minimized and the reduction in spectral broadening is compensated by increasing the amplification in the present invention.

The influence of other longitudinal modes is also considered herein. To suppress the interference from adjacent modes that can be converted into amplitude jitter in the spectrum-slicing process, the pulse repetition rate is increased and, consequently, the mode spacing. With a time-domain multiplexing method, it is possible to increase them without changing the source repetition rate.

After the time-domain multiplexing, each longitudinal mode is sliced as a CW channel. To check the degradation in CW amplitude stability, one can measure RIN values at various wavelengths and compare them with source laser RIN value. The RIN degradation is restrained within 7 dB/Hz in both anti-Stokes and Stokes regions as described herein. The CW channels near the source wavelength experience higher levels of degradation.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
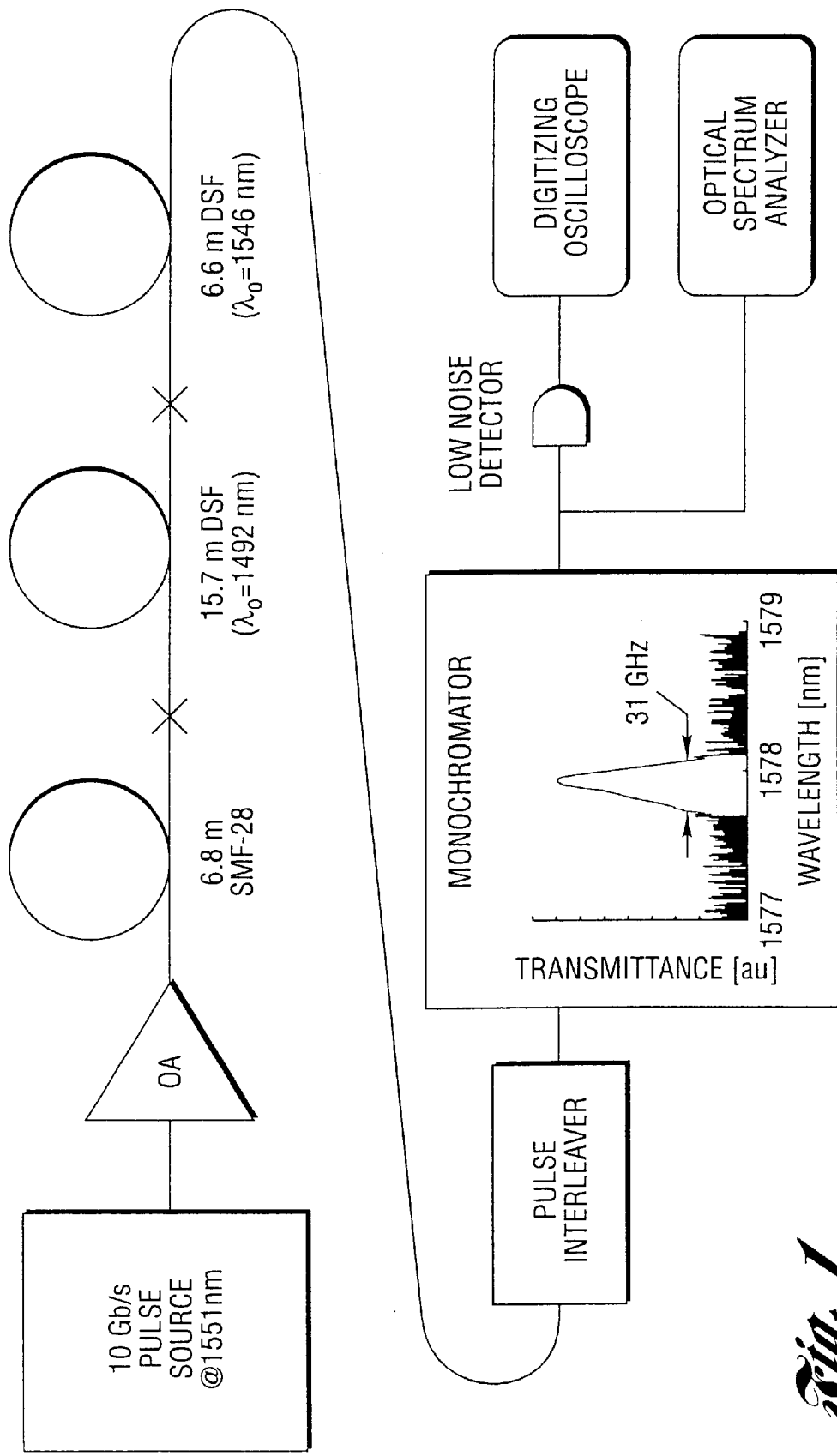
FIG. 1 is a schematic view of a system for multi-wavelengths continuous wave generation (OA=Optical Amplifier; DSF=Dispersion Shifted Fiber; λo=Zero Dispersion Wavelength); an inset graph shows the filter function of a monochromator taken with 0.05 nm (~6 GHz) spectral resolution.

A system of the present invention is shown schematically in FIG. 1. The system includes a Pritel actively mode-locked fiber laser which generates a hyperbolic-secant pulse train at 10 GHz repetition rate. A center wavelength is set at 1552 nm and the 3 dB bandwidth at 2.4 nm. With 1.1 psec pulsewidth, $\Delta\upsilon \cdot \Delta\tau = 0.328$. The laser output is amplified to 800 mW average power by an SDL optical amplifier of the system.

A multi-section pulse compression scheme as described in the above-noted application is used to obtain the SC. In the system, three concatenated sections of fiber are used. The first two sections of fiber are responsible for soliton-effect pulse compression and spectral broadening. In the third section of fiber, pulse breakup is induced in the time-domain causing flattening of the broadened spectrum. The first section may be 6.8 meters of Corning SMF-28 and the second section may be 15.7 meters of DS fiber with a zero-dispersion wavelength at 1492 nm and a dispersion slope of 0.039 ps/nm²-km. The third section may be 6.6 meters of DS fiber with a zero-dispersion wavelength at 1546 nm and a dispersion slope of 0.056 ps/nm²-km. The lengths of the first two sections are determined by cutting the fiber back until the optimum compression point is encountered. The length of the third section is set to maximize the flatness of the SC. In both cases, additional cut-backs are done to verify that the first compression point is selected.

Figure 2:
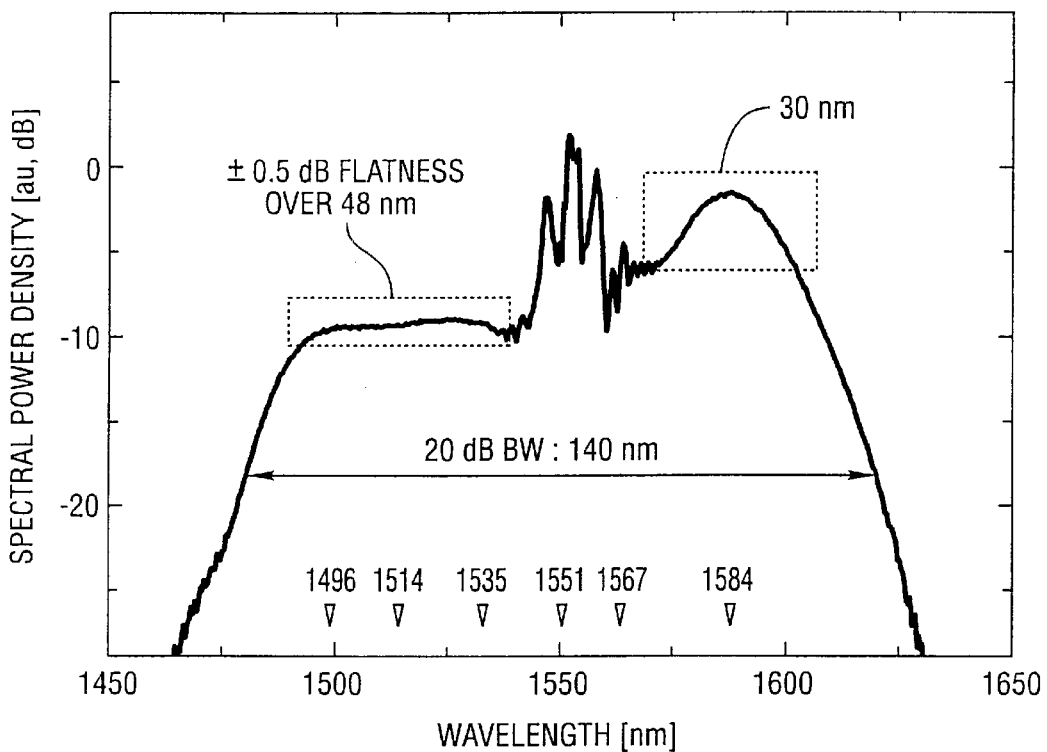
FIG. 2 is a graph which illustrates a profile of a supercontinuum generated with the system of FIG. 1; the profile has 48 nm spectral region with ±0.5 dB flatness on the anti-Stokes side; on the Stokes side, the profile 30 nm wide spectral peak with equal or higher power density; down-triangles indicate the wavelengths at which RIN measurements are taken.
Figure 3:
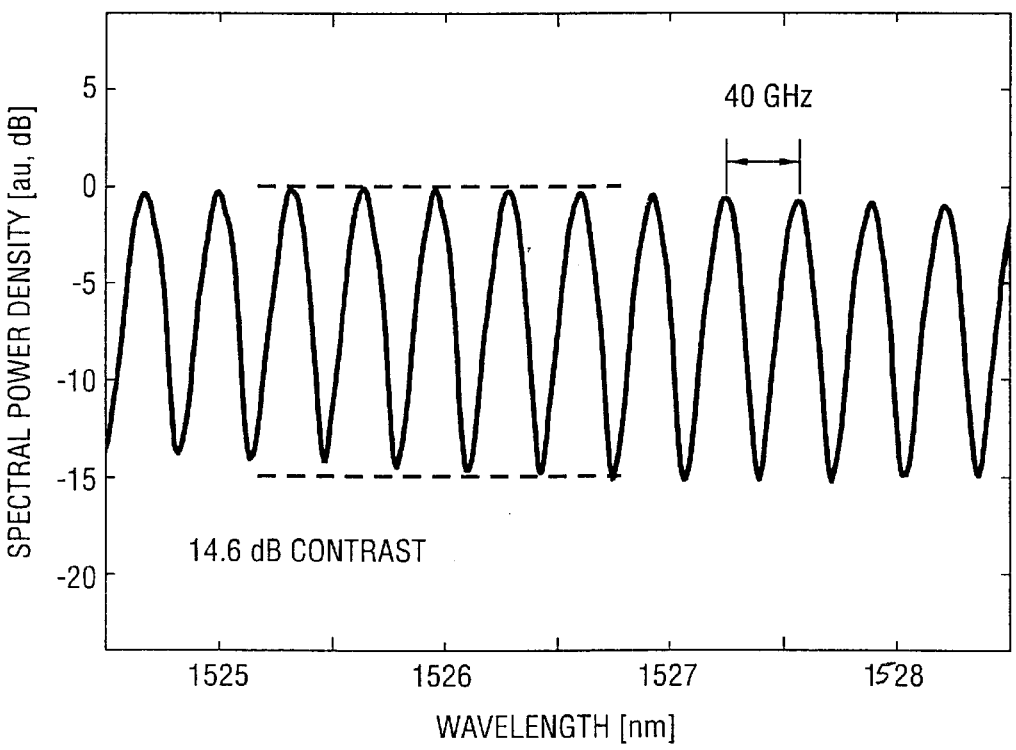
FIG. 3 is a graph illustrating a longitudinal mode structure in a flat spectral region after the pulse interleaver of FIG. 1; 40 GHz mode spacing and >12 dB contrast are obtained at 6 GHz scanning resolution.

Spectrum of the generated SC is plotted in FIG. 2. It has 140 nm of 20 dB bandwidth measured from the center peak. The spectrum has wider and flatter spectral broadening to the anti-Stokes side. This asymmetry in spectral shape results from the effect of the asymmetric third-order dispersion. On the anti-Stokes side, one obtains ±0.5 dB flatness over a 48 nm wide spectral region with a power density of +4.2 dBm/nm. On the Stokes side, a 30 nm wide spectral peak is obtained above the power density level of the anti-Stokes side. The power density of the Stokes side is 7.5 dBm/nm.

Figure 4:
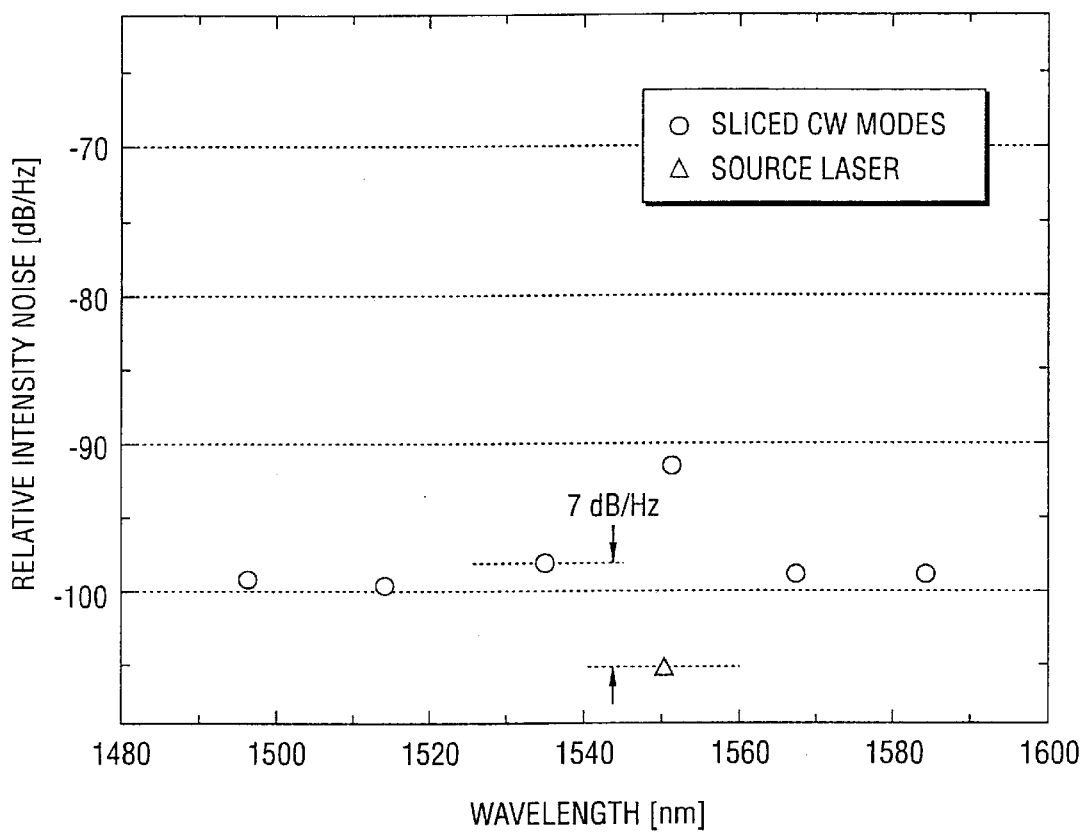
FIG. 4 is a graph of RIN measurement results; when compared to the source laser, <7 dB/Hz degradation is obtained.

Time-domain multiplexing is preferably used to increase the longitudinal or spectral mode spacing. A pulse interleaver comprising of a 1-to-4 splitter and delay lines is used to quadruple the repetition rate from 10 GHz to 40 GHz. FIG. 4 shows a scan of modes obtained with an optical spectrum analyzer. Across the flat spectral region and the spectral peak, one obtains >12 dB peak-to-trough contrast. The contrast in the scan is limited by 0.05 nm (~6 GHz) spectral resolution. The lengths of the delay lines are important since the imbalance in lengths results in incomplete cancellation of in-between modes.

For longitudinal mode slicing, a monochromator may be used as a filter. However, any optical filter with a narrow bandwidth can be used such as a Mach-Zehnder, an arrayed wave guide grating, a Fabry-Perot, or fused-tapered couplers. The filter bandwidth affects the channel output power as well as the interference from adjacent modes. Considering the 40 GHz channel spacing in this case, the 20 dB bandwidth of the filter is set at 31 GHz. The filter function profile obtained with ASE input is shown in the inset of FIG. 1. At the output of the monochromator, a CW channel is coupled to diagnostics for characterization. Due to the losses in narrow-band spatial filtering and free-space coupling, the output power levels of the sliced longitudinal modes are around −41 dBm in the anti-Stokes region and near −39 dBm in the Stokes region.

The amplitude jitter of the CW channels can be characterized by measuring the RIN at various spectral points marked in FIG. 2. The selected CW channel output is detected by a low-noise detector with 10 MHz bandwidth. The detector output voltage is sampled 1500 times at every quarter second. Based on the voltage samples, the RIN is calculated according to the formula:

$$RIN = 10 * Log(\Delta P / P_{ave}) [dB/Hz]$$

where $P_{ave}$ is the average power (i.e. the power contained in zero Hz frequency component) and $\Delta P$ is the rms power spectral density of the intensity fluctuation. The detector input power is equalized to the lowest available level so that each measurement has the same average. The effect of minor average variation is corrected by normalization. To compensate the influence of detector noise, the average and rms fluctuation of dark noise voltage are measured and subtracted in the RIN calculation. The RIN of the source laser is measured at the center wavelength for a reference.

The RIN measurement results are shown in FIG. 4. The RIN of the source laser is also marked. Except for one wavelength point at 1551 nm, RIN values are uniformly distributed within ±0.7 dB/Hz range with an average value at −98.9 dB/Hz. One can see that the whole process of SC generation and longitudinal mode slicing introduces less than 7 dB/Hz RIN degradation in the anti-Stokes and Stokes side channels. It is clear in FIG. 4 that CW channels show worse performance near the source laser wavelength than on the anti-Stokes or Stokes sides. This RIN degradation can be attributed to the rapid hopping of mode power in the source laser itself.

Figure 5:
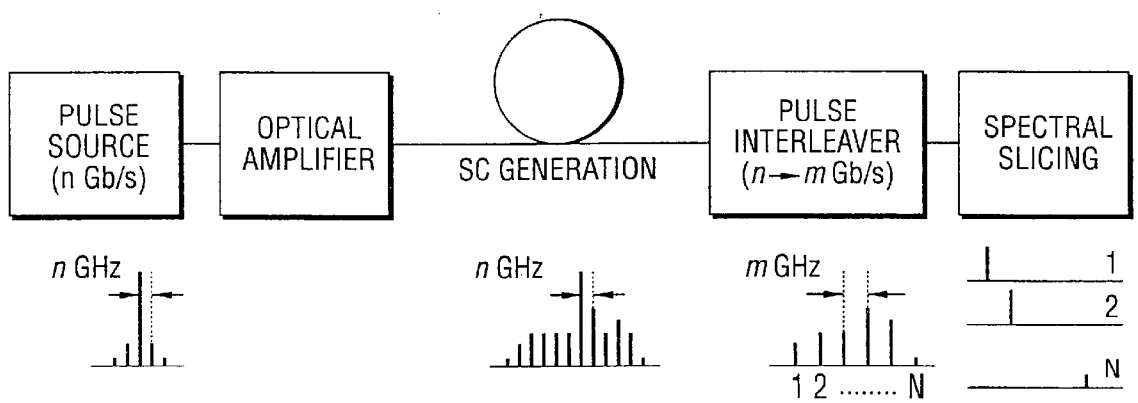
FIG. 5 is a schematic diagram of a continuous wave-generating system of the present invention.

Based on the results noted above, one can use the system described herein as a broadband WDM source. The block diagram in FIG. 5 shows a basic structure of the proposed source. An n GHz MLL is used for a seed pulse source. An optical amplifier enhances its pulse power for the SC generation at the next stage. The pulse interleaver increases the channel spacing from n GHz to m GHz. At the last stage, channels are sliced with an optical filter. Each channel can be separately encoded and transmitted to form a transmitter.

In summary, a multi-wavelength CW generation system of the present invention is provided by spectrum-slicing of longitudinal modes in fiber-based SC. Amplitude jitter in CW channels is suppressed by modifying the SC generation and the spectrum-slicing scheme of the above-noted application. A short-fiber SC generation scheme is provided and a pulse interleaver is added to reduce the influence of adjacent modes.

From a 140 nm SC seeded with 10 GHz pulse train, CW channels are sliced with 40 GHz channel spacing by a monochromator. The RIN is measured at various wavelengths to check the amplitude jitter. Except for the modes near the source laser wavelength, uniform distribution of RIN values within 1.4 dB/Hz range is observed with −98.9 dB/Hz average value. This result indicates that less than 7 dB/Hz RIN degradation occurs during the whole process of SC generation and spectrum-slicing.

This scheme can be utilized as a broadband WDM by increasing the number of uniform channels. When the source is between 100–200 channels and the data rate is 622 Mb/s~10 Gb/s the source can be utilized in a number of different applications. For example, the source can be utilized in a long-haul transmission system (i.e. 100 channels*10 Gb/s=1 Tb/s transmission). The source can also be used in a multi-channel Metropolitan Area Network (MAN) or a Local Area Network (LAN) or in a multiple wavelength testing system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for generating a broadband spectral continuum, the method comprising:

generating pulses at a repetition rate greater than or equal to 1 Gb/s;

compressing the pulses in a temporal domain to obtain compressed pulses having a spectrum; and shaping the spectrum of the compressed pulses through higher order dispersion effects and self-phase modulation to obtain the broadband spectral continuum, the continuum having a plurality of substantially uniform longitudinal modes each of which is a narrow band continuous wave in the time domain and wherein the modes are spectrally spaced based on the repetition rate.

2. A system for generating broadband spectral continuum, the system comprising:

a pulse generator including a laser for generating pulses at a repetition rate greater than or equal to 1 Gb/s; and an optical fiber including at least one pulse compression stage for compressing the pulses through non-linear effects to obtain compressed pulses having a spectrum, the optical fiber further including a spectral shaping stage optically coupled to the at least one pulse compression stage adjacent an output end of the fiber to shape the spectrum of the compressed pulses through higher order dispersion effects and self-phase modulation to obtain the broadband spectral continuum, continuum having a plurality of substantially uniform longitudinal modes each of which is a narrow band continuous wave in the time domain and wherein the modes are spectrally spaced on the repetition rate.

3. A system for generating narrow band, continuous waves (CW) substantially simultaneously on multiple CW channels at multiple wavelengths and with channel spacing of at least 1 Ghz, the system comprising:

a pulse generator including a single laser for generating pulses at a repetition rate greater than or equal to 1 Gb/s;

an optical fiber including at least one pulse compression stage and a spectral shaping stage, the at least one pulse compression stage receiving the pulses at a first end of the fiber and the spectral shaping stage generating a broadband spectral continuum within the fiber and providing the broadband spectral continuum at a second end of the fiber, the continuum having a plurality of substantially uniform longitudinal modes each of which is a narrow band continuous wave in the time domain and wherein the modes are spectrally spaced based on the repetition rate; and at least one optical filter coupled to the second end of the fiber for spectrally-slicing the longitudinal modes from the broadband spectral continuum to obtain the continuous waves.

4. A method for generating a broadband spectral continuum, the method comprising:

generating pulses at a repetition rate greater than or equal to 1 Gb/s;

compressing the pulses in a temporal domain to obtain compressed pulses having a spectrum; and shaping the spectrum of the compressed pulses to obtain the broadband spectral continuum, the continuum having 100 or more substantially uniform longitudinal modes each of which is a narrow band continuous wave in the time domain and wherein the modes are spectrally spaced based on the repetition rate.

5. A method for generating a broadband spectral continuum as a transmitter, the method comprising:

generating pulses at a repetition rate greater than or equal to 1 Gb/s;

compressing the pulses in a temporal domain to obtain compressed pulses having a spectrum;

shaping the spectrum of the compressed pulses to obtain the broadband spectral continuum, the continuum having a plurality of substantially uniform longitudinal modes each of which is a narrow band continuous wave in the time domain and wherein the modes are spectrally spaced based on the repetition rate; and coupling the continuum to a length of transmission fiber in a long-haul transmission system.

6. A method for generating a broadband spectral continuum as a transmitter, the method comprising:

generating pulses at a repetition rate greater than or equal to 1 Gb/s;

compressing the pulses in a temporal domain to obtain compressed pulses having a spectrum;

shaping the spectrum of the compressed pulses to obtain the broadband spectral continuum, the continuum having a plurality of substantially uniform longitudinal modes each of which is a narrow band continuos wave in the time domain and wherein the modes are spectrally spaced based on the repetition rate; and coupling the continuum to a length of transmission fiber in a metropolitan area network.

7. A method for generating a broadband spectral continuum as a transmitter, the method comprising:

generating pulses at a repetition rate greater than or equal to 1 Gb/s;

compressing the pulses in a temporal domain to obtain compressed pulses having a spectrum;

shaping the spectrum of the compressed pulses to obtain the broadband spectral continuum, the continuum having a plurality of substantially uniform longitudinal modes each of which is a narrow band continuous wave in the time domain and wherein the modes are spectrally spaced based on the repetition rate; and coupling the continuum to a length of transmission fiber in a local area network.

8. A method for generating a broadband spectral continuum as a transmitter, the method comprising:

generating pulses at a repetition rate greater than or equal to 1 Gb/s;

compressing the pulses in a temporal domain to obtain compressed pulses having a spectrum;

shaping the spectrum of the compressed pulses to obtain the broadband spectral continuum, the continuum having a plurality of substantially uniform longitudinal modes each of which is a narrow band continuous wave in the time domain and wherein the modes are spectrally spaced based on the repetition rate; and coupling the continuum to a multiple wavelength testing system.

* * * * *